US006785267B1

(12) United States Patent
Knappe

(10) Patent No.: US 6,785,267 B1
(45) Date of Patent: Aug. 31, 2004

(54) ACCESS AND CONTROL SYSTEM FOR ENHANCED AUDIO CAPABILITIES IN AN INTEGRATED TELEPHONY/HIGH SPEED DATA ACCESS DEVICE

(75) Inventor: Michael E. Knappe, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/228,031

(22) Filed: Jan. 4, 1999

(51) Int. Cl.[7] ............................................. H04L 12/66
(52) U.S. Cl. ..................... 370/353; 370/356; 379/93.07
(58) Field of Search ................. 370/351, 352, 370/353, 354, 355, 356, 401, 463, 465, 466; 379/88.13, 88.17, 93.09, 100.15, 100.16, 399.01, 386, 93.07; 375/222

(56) References Cited

U.S. PATENT DOCUMENTS

| 4,506,358 | A | | 3/1985 | Montgomery |
|---|---|---|---|---|
| 4,757,495 | A | | 7/1988 | Decker et al. |
| 5,459,722 | A | * | 10/1995 | Sherif .......................... 370/60.1 |
| 5,940,598 | A | * | 8/1999 | Strauss et al. .......... 395/200.79 |
| 5,991,292 | A | * | 11/1999 | Focsaneanu et al. ......... 370/352 |
| 6,035,020 | A | * | 3/2000 | Weinstein et al. ........ 379/93.09 |
| 6,058,110 | A | * | 5/2000 | Bellenger et al. ............ 370/352 |
| 6,108,330 | A | * | 8/2000 | Bhatia et al. ................ 370/352 |
| 6,141,341 | A | * | 10/2000 | Jones et al. .................. 370/352 |
| 6,236,653 | B1 | * | 5/2001 | Dalton et al. ................ 370/352 |
| 6,445,697 | B1 | * | 9/2002 | Fenton ......................... 370/357 |

* cited by examiner

Primary Examiner—Chau Nguyen
Assistant Examiner—Duc Duong
(74) Attorney, Agent, or Firm—Marger Johnson & McCollom, PC

(57) ABSTRACT

A telephone to digital data network interface 118 and method for its operation are disclosed. Interface 118 provides a connection point 52 and a standard line interface 50 for a POTS phone. Audio quality selector 86 interprets signaling received from a POTS phone (e.g., hookswitch signaling, DTMF signaling, or voice recognition commands) to select between multiple audio paths within interface 118. A first audio path includes the telephone line interface 50 and provides telephone-grade audio. Preferably, a second audio path includes a wideband audio output device (speaker 114) and a wideband audio input device (microphone 116). Audio quality selector 86 selects one of these paths using switches 106 and 108. It also communicates with digital audio processor 90, which preferably contains both a telephone-grade and a wideband audio codec and is capable of call-in-progress reconfiguration between the two.

The present invention offers both a standard POTS phone interface and an option for higher-quality telephony when the other end of the conversation can provide this quality also.

24 Claims, 7 Drawing Sheets

ACCESS AND CONTROL SYSTEM FOR ENHANCED AUDIO CAPABILITIES IN AN INTEGRATED TELEPHONY/HIGH SPEED DATA ACCESS DEVICE

FIELD OF THE INVENTION

This invention pertains generally to telephony, and more particularly to telephony over digital data networks.

BACKGROUND OF THE INVENTION

Plain-old telephone service (POTS) has existed now for well over 100 years. During that time, people have grown used to the limited sound quality of POTS. At the outset of the telephone era, these limits on sound quality were due largely to the telephone's simple transducers and the transmission effects of long analog lines. As better transducers and compensation (gain and filtering) for transmission line effects became available, multiplexing transmission techniques also were introduced. These transmission techniques relied on the traditional limited audio bandwidth for voice communication, and thus the traditional limits on telephone sound quality remained.

As the public-switched telephone network (PSTN) evolved into a largely digitally-switched system between the 1960s and today, limited audio capabilities were maintained. The T1 digital carrier format, which is virtually ubiquitous within the PSTN today, relies on the appearance, at a PSTN analog-to-digital converter, of an analog telephone audio signal with a highest frequency of less than about 3500 Hz (sampled at 8 kHz and brick-wall filtered below 3500 Hz). Standard telephone handsets also cut off low-frequency transmissions to reduce 60 Hz power-line hum and other interference. These constraints limit the actual audio frequency range for a typical POTS phone conversation to 300–3400 Hz.

Packet-switched data networks now offer an alternative to PSTN telephony. Two computer users connected to a packet-switched data network can communicate data in any format that both understand. This includes packetized, digitized telephony in a variety of formats, including some offering stereo sound with a frequency range much larger than that offered by the PSTN and the standard POTS telephone. Due to cost and availability, current IP telephony equipment also uses traditional narrowband handsets.

SUMMARY OF THE INVENTION

Integrated telephony/high speed data access technology is now entering the marketplace. With this technology, a single wide-area-network (WAN) connection allows simultaneous packet data and packetized POTS telephone transmissions.

A packetized POTS transmission from a first integrated phone/data transceiver terminates either at a PSTN gateway (either digital or analog), or at a second integrated phone/data transceiver. The present invention recognizes that a packetized POTS transmission may be processed differently depending on how it terminates. For instance, if it terminates at a PSTN gateway, sound quality commensurate with the PSTN is all that makes sense. But if it terminates at a packetized POTS receiver, a much richer sound quality may be possible.

The present invention describes a telephone to digital data network interface. The interface comprises a telephone connection point (such as an RJ11 jack, electrical terminal pair, or a wire with an RJ11 plug) connected to a first selectable interface audio processing path for telephone-grade audio communication. The interface also comprises a second selectable interface audio processing path for wideband audio communication. An audio quality selector monitors the first processing path for the presence of switchover commands, and selects a desired audio processing path based on such a command when it is received from a telephone connected to the telephone connection point. Thus both standard telephone-grade and wideband telephony are available to the user and selectable from an attached telephone.

The telephone connection point preferably comprises an analog telephone line interface accepting a POTS phone. Preferably, the two audio processing paths use different digital audio decoders—one for wideband and one for telephone-grade audio. The second audio processing path preferably bypasses the telephone connection point, and, e.g., provides a connection for a headset, a stereo or television audio input, or a computer.

In another aspect, the invention provides a method of operating an analog telephone/digital data network interface. The method comprises the step of presenting a standard analog telephone line interface to an attached telephone set. But the interface detects a signal produced at the standard analog telephone line interface by the attached telephone set, and responds to the signal by reconfiguring audio processing between a telephone-grade processing path and a wideband processing path within the telephone/data network interface. Preferably the signaling is performed with DTMF codes, hookswitch flashes, voice prompts and commands, or a combination of these signaling techniques.

In yet another aspect, a cable modem transceiver is disclosed. This transceiver has connection points for remote data, local data, a telephone, and wideband audio. The transceiver further comprises a telephone to digital data network interface that has multiple switchable audio outputs, one of the switchable audio outputs connected to the telephone connection point and another of the switchable audio outputs connected to the wideband audio output connection point. The transceiver also comprises a bridge that routes data between the remote data connection point, the local data connection point, and the telephone to data network interface.

BRIEF DESCRIPTION OF THE DRAWING

The invention may be best understood by reading the disclosure with reference to the drawing, wherein.

DETAILED DESCRIPTION OF THE PREFERRED EMBODIMENTS

The following terms have the following meanings for purposes of this disclosure. Telephone-grade audio has an audio bandwidth with an upper frequency limit lower than 4500 Hz, and when in digital format, is digitally sampled at a 10 kHz or lower rate. Wideband audio has an audio bandwidth with an upper frequency limit greater than 6000 Hz, and when in digital format is digitally sampled at a 14 kHz or higher rate. A telephone is a device for two-way transmission of acoustic energy via electrical and/or electromagnetic signaling over a signaling network. A telephone contains at least two transducers, one that converts acoustic energy to electrical or electromagnetic energy, and one that performs the reverse of this process. A telephone connection point can either be analog or digital.

Integrated Telephony/Data Access Device Operation

Figure 1:
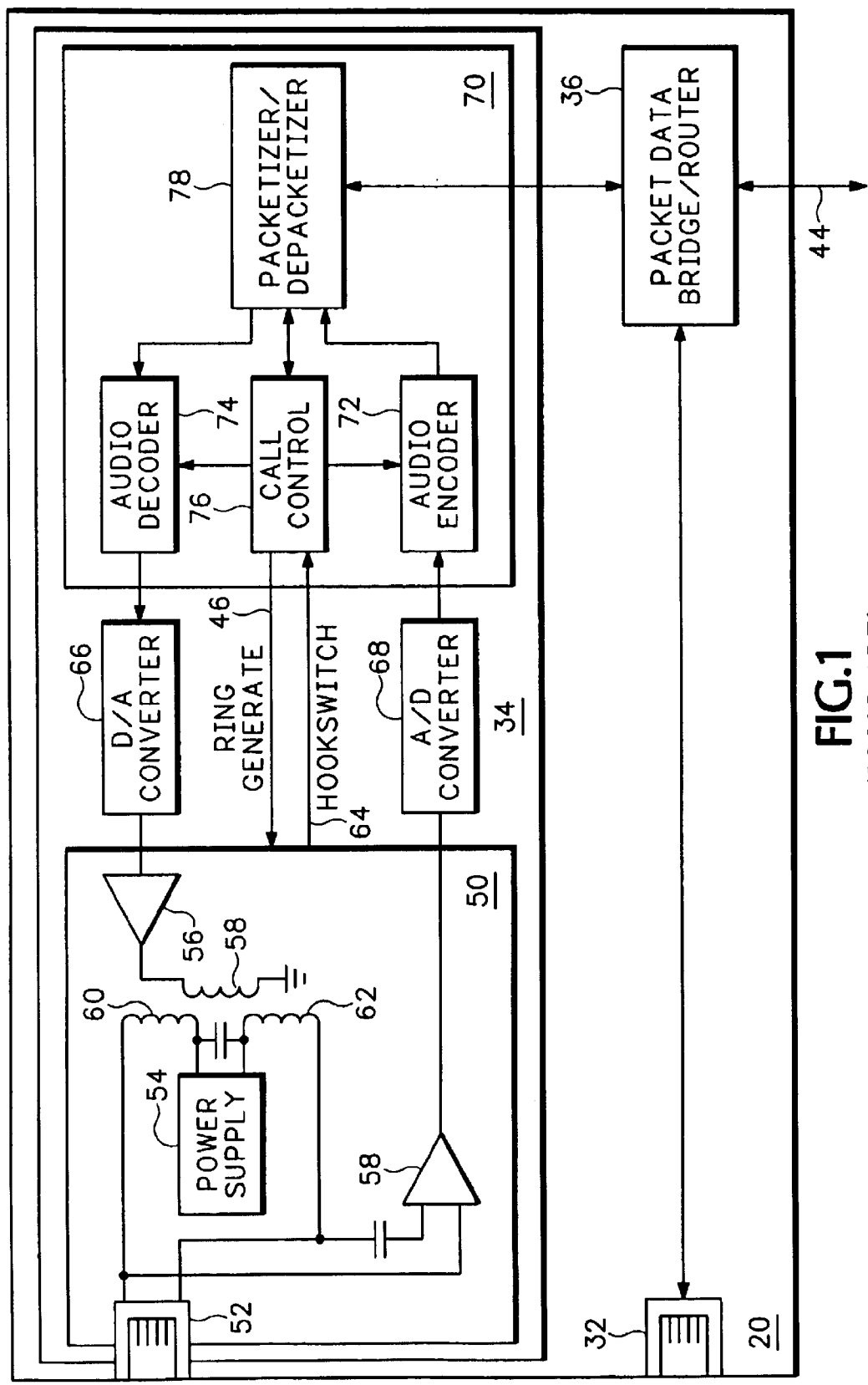
FIG. 1 illustrates a prior art integrated telephone/data access device.

FIG. 1 shows an integrated telephone/data access device 20 (e.g., a cable modem transceiver) comprising two main blocks, packet data bridge/router 36 and telephone/data network interface 34. Packet data bridge/router 36, operating in a well-understood manner, the details of which are not critical to the present invention, communicates over a data network connection 44, routing traffic appropriately between data network connection 44, local data network connection 32, and telephone/data network interface 34. Device 20 thus has the capability to perform data transfer while allowing simultaneous telephone access over data network connection 44.

Telephone/data network interface 34 looks like an analog telephone local loop to an attached phone, and like a packet data node to packet data bridge/router 36. Generally, interface 34 comprises an analog line interface 50 and a digital audio processor 70. Audio passing from analog line interface 50 to digital audio processor 70 passes through an analog-to-digital (A/D) converter 68. Audio passing in the opposite direction passes through a digital-to-analog (D/A) converter 66. A separate hookswitch signal 64 indicates to digital audio processor 70 whether an attached phone is on or off hook.

Analog line interface 50 emulates the analog line interface of the telephone company central office. In the exemplary circuit 50, power supply 54 provides talking battery and ringing voltage to RJ11 jack 52, and indicates on/off hookswitch conditions. Coils 58, 60, and 62 form a balanced transmitter. Driver 56 provides transmit audio drive current, and receiver 58 senses received audio.

Digital audio processor 70 handles the remaining phone processing tasks. Call control 76 handles call setup/takedown, and coordinates the operation of packetizer/depacketizer 78, decoder 74, encoder 72 and generates ring signal 46. Encoder 72 may compress digital audio received from A/D converter 68; encoder 72 may also perform voice activity detection (VAD), discrete-tone multi-frequency (DTMF, or "touch-tone") detection, and echo cancellation. Decoder 74 may decompress digital audio received from the remote end of a phone connection. Decoder 74 may also provide tone generation (DTMF, dial-tone, ringback, busy signal) for line interface 50, and produce caller ID modulation signals. The details of these digital audio processor functions are all well understood in the industry and will not be repeated here.

Figure 2:
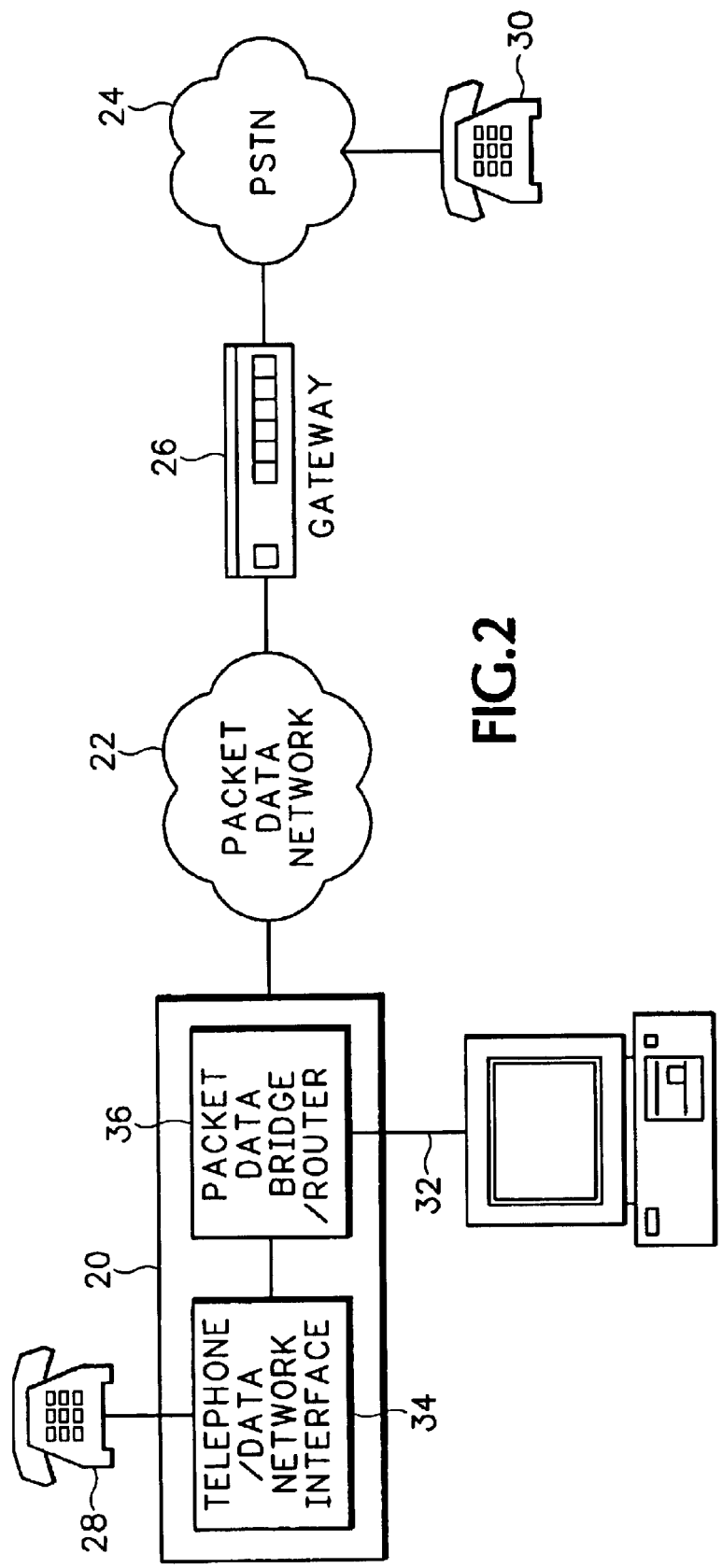
FIGS. 2 and 3 show two possible network paths for calls directed through an integrated telephone/data access device.
Figure 3:
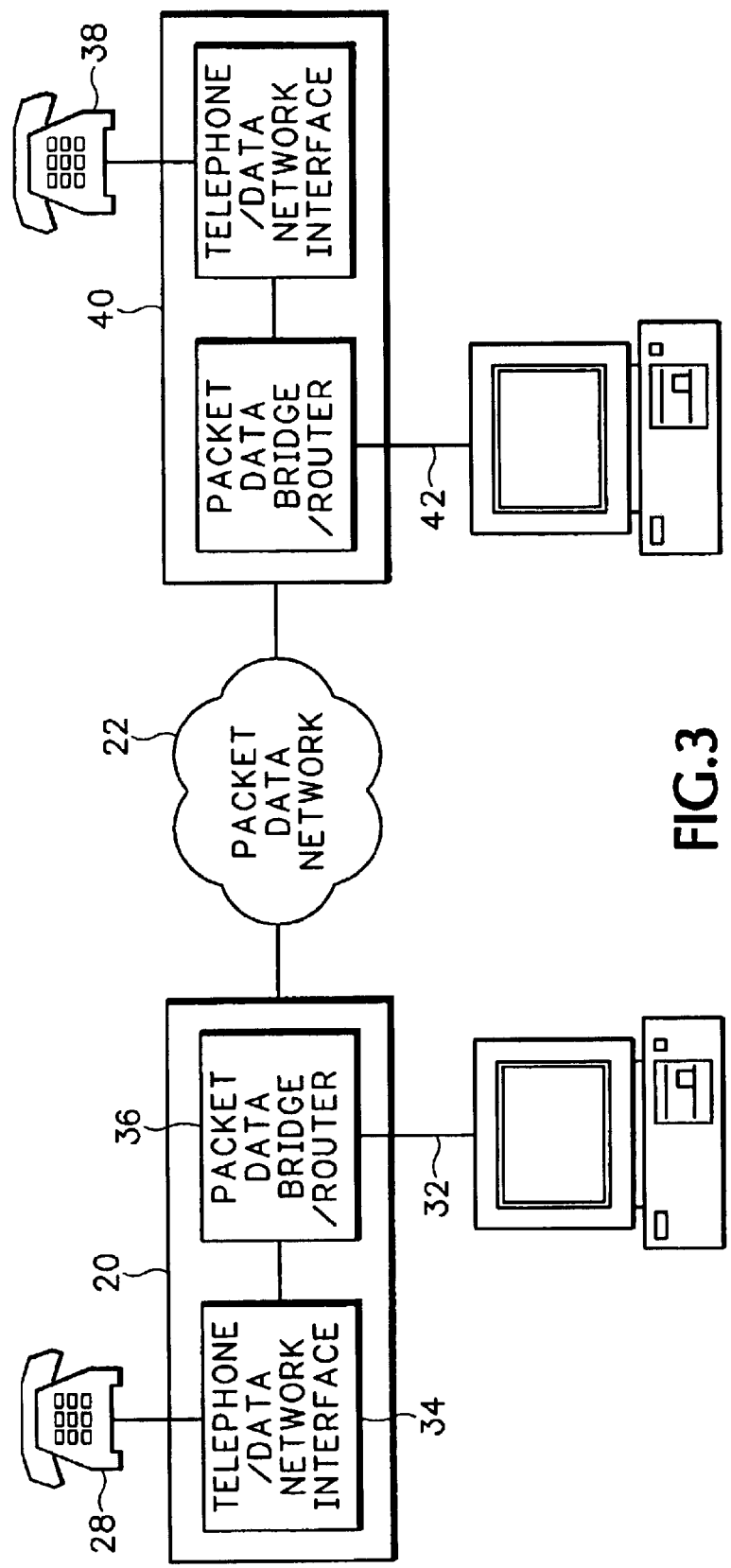

Telephone/data network interface 34 allows a user to make and accept what appear to be conventional phone calls over a POTS phone 28 (see FIGS. 2 and 3). Calls actually pass through integrated telephone/data access device 20 and onto packet data network 22. The other end of the call may be similarly connected through an integrated telephone/data access device 40 onto packet data network 22, as shown in FIG. 3. But the other end of the call may also connect to PSTN 24, in which case a gateway 26 is needed to complete the connection, as shown in FIG. 2.

Data Network vs. PSTN Telephony Communication Paths

The human auditory system has a much wider range of operation than the PSTN. Normal human hearing perceives sound over a frequency range lying roughly between 20 Hz and 20,000 Hz, with the greatest sensitivity between about 60 Hz and 15,000 Hz. In the center of this frequency range, the human ear has a dynamic range of over 100 dB. By using both ears, a human can also perceive directional cues from intensity, phase, and timing differences in the sound received at each ear. But the PSTN, with its frequency range of 300 Hz to 3400 Hz, dynamic range of less than 50 dB, and monaural capability, limits audio communication to a level that, though intelligible, falls far below the limits of human perception.

Digital audio codecs (a matched audio encoder/decoder pair) span a large audio quality range. At the low end of audio quality, low bit-rate codecs such as those described in standards G.723.1, G.728, G.729, and G.729 Annex A, all promulgated by the International Telecommunications Union (ITU), generally produce sound quality inferior to the PSTN. ITU specification G.711 includes 8 kHz, 8 bits per sample PCM, generally following the digital standard used on the PSTN and thus offering comparable quality to the PSTN. Other codecs, such as those described in ITU specification G.722, offer 16 kHz or greater sample rates and thus offer the potential for wideband telephony. Compact-disk-quality stereo audio uses two 44.1 kHz sampled channels, each with a dynamic range of about 100 dB.

Despite the availability of wideband codecs, with a telephony audio data path as shown in FIG. 2, the transmission of audio with quality better than G.711 over packet data network 22 is unwarranted. POTS phones 28 and 30 are designed for PSTN bandwidths. Gateway 26 must also conform to PSTN bandwidths when it communicates with PSTN 24. These constraints limit conversation bandwidth, and thus a wideband codec used in such a communication path merely wastes data network bandwidth. Gateway 26 and telephone/data network interface 34 typically will transfer digital audio to each other using telephone-grade codecs, such as a G.711 codec set, or a low-bit-rate codec set such as G.729.

With a communication path as shown in FIG. 3, the transmission of audio with quality better than G.711 over packet data network 22 is still unwarranted. Although the PSTN is not part of the communication path, POTS phones 28 and 38 still use transducers with limited frequency capabilities. This is generally desirable, since these phones also are used for PSTN communications, and must meet PSTN specifications. But despite the limitations of POTS phones 28 and 38, an integrated telephone/data access device pair could be programmed to utilize any codec that fits hardware data bandwidth constraints and that both recognize, including G.722 or even a CD-quality codec.

A First Preferred Embodiment

The present invention recognizes that a POTS interface for an integrated telephone/data access device is desirable for many reasons. The POTS interface offers compatibility with existing phones and with the PSTN generally. It has been refined over more than a century of operation. It provides some privacy. It is familiar to everyone in a household from toddlers on up, even though the majority of these users may not understand or care whether their voice is being transmitted over a high-speed data network or a string.

At the same time, the present invention recognizes that the POTS phone is not revered for its audio quality, and that many POTS users would prefer better quality if it were available. In one aspect, the present invention thus seeks to combine a standard POTS interface with an option for enhanced audio. The resulting telephone to digital data network interface may be substituted for those of the prior art in an integrated telephone/digital data network access device, such as a cable modem.

Figure 4:
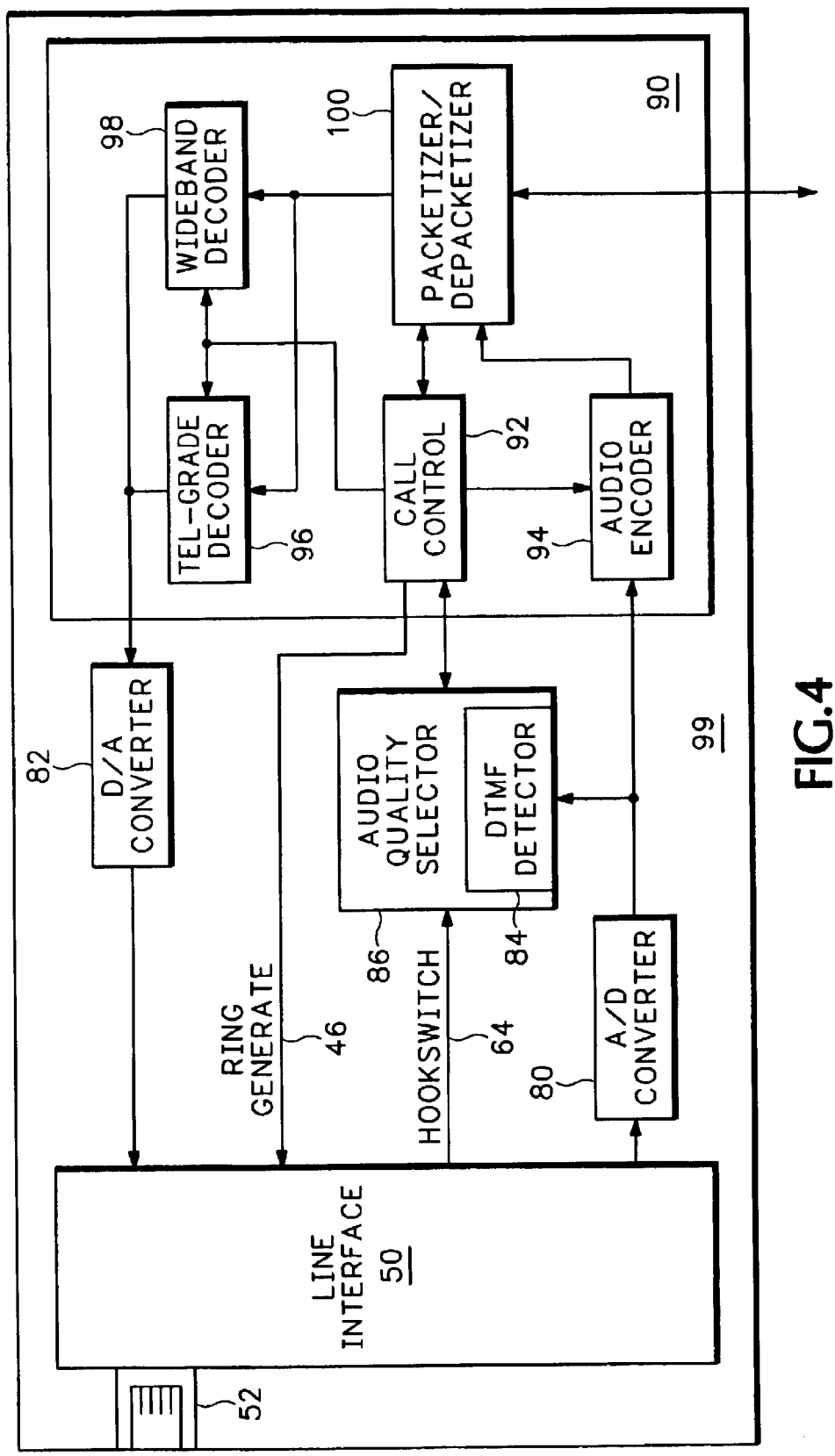
FIG. 4 shows a telephone/data network interface according to the present invention.

In a first preferred embodiment depicted in FIG. 4, a telephone/data network interface 99 includes a POTS line interface 50 with, e.g., one or more attached RJ11 jacks 52. Telephone/data network interface 99 connects to a data network through digital audio processor 90. A/D and D/A converters 80 and 82 link line interface 50 with digital audio processor 90. In addition, an audio quality selector 86 (which may physically reside on digital audio processor 90) links line interface 50 with digital audio processor 90. Audio quality selector 86 is shown with a built-in DTMF detector 84, though a separate DTMF detector 84 (even one connected on the analog side of A/D 80) may be employed. Digital audio processor 90 has two decoders, a wideband decoder 98 (e.g., G.722-compliant) and a telephone-grade codec 96 (e.g., G.711-compliant). Call control 92 provides control lines to selectively enable one or the other of these decoders.

Audio quality selector 86 detects requests for audio quality reconfiguration that originate from a POTS phone attached to RJ11 jack 52. These requests may be entered from a conventional phone by hookswitch flash signaling, by depressing buttons on a numeric keypad to perform DTMF signaling, by voice command, or by a combination of these techniques. For example, audio quality selector 86 may be programmed to recognize two quick hookflashes, or a DTMF code such as "*77", as a request for wideband audio. Audio quality selector 86 may also be configured to recognize a voice command such as "wide", "stereo", or "on TV" as a request for wideband audio. A voice command may be preceded by a signal such as a DTMF "*" to alert audio quality selector 86 to look for a voice command.

When audio quality selector 86 detects a request for audio quality reconfiguration that affects the codec used by digital signal processor 90, it relays the request to call control 92. Call control 92 contains an audio-grade renegotiator function. The renegotiator function examines whether the current codec provides the requested audio quality. If it does not, the renegotiator can attempt to renegotiate an appropriate codec with its opposite endpoint. Preferably, the renegotiator relies on a codec "preference list" that matches the requested audio quality.

Audio quality selector 86 may also "capture" signals designated for it. For instance, audio quality selector 86 may recognize all DTMF sequences input by the user, remove those directed to itself, and pass the remaining DTMF codes on to call control 92. Thus when an audio selection command is keyed or spoken by a user, the corresponding audio can be blanked instead of being interpreted by call control 92 and/or transmitted to a listener at the other end of the conversation.

Another desirable function for telephone/data network interface is an indication to a user that wideband audio is available from the other end of the conversation. At call connection, call control 92 performs codec negotiation with the transceiver at the opposite end of the data network connection using, e.g., the ITU H.323 standard or the SGCP (Simple Gateway Control Protocol). Call control 92 may negotiate for wideband capability first, or the opposite end may request wideband. In either case, call control 92 can implement a remote input bandwidth detector function—if wideband transmission is possible, the local user may be signaled, e.g., by an audible tone or a voice phrase such as "incoming wideband". Alternately, a caller-ID signal producing a visual indication of wideband capability may be generated by call control 92.

The following pseudocode illustrates one possible algorithm, incorporating several of the above-described features, that call control 92 and audio quality selector 86 can use according to the present invention. This pseudocode operates if wideband capability is detected on the incoming digital audio channel. The pseudocode first indicates to the user that wideband is available. If the user has set a preference for automatic wideband switchover, this is performed. The code then goes into a loop for the duration of the call to process DTMF bandwidth switchover commands from the user.

```
if (incomingCall.audioBandwidth == WIDEBAND ||
    outgoingCall.widebandCapability == DETECTED)
{
    if (userPreference.bandwidthIndicator == TONE)
        playIndicatorTone (WIDEBAND_INDICATOR_TONE);
    else if (userPreference.bandwidthIndicator == IVR)
        playVoicePrompt("Incoming Wideband");
    if (displayCapability == PRESENT)
        displayText("Incoming Wideband");
    if (userPreference.bandwidthSwitchover == AUTO)
        setCodec.receive(WIDEBAND_CODEC);
    while (CALL_IN_PROGRESS)
    {
        waitForDTMFSequence(BREAK_ON_CALL_END);
        if (DTMFEntered == "*77")
        {
            if (codec.receive == PSTN_CODEC)
                setCodec.receive(WIDEBAND_CODEC);
            else
                setCodec.receive(PSTN_CODEC);
        }
        else sendDTMF(DTMFEntered);
    }
}
```

Other Preferred Embodiments and Applications

Although the embodiment of FIG. 4 illustrates the basic control mechanism of the present invention, it will generally result in limited improvement in final audio quality, unless the attached POTS phone has been designed with an audio output transducer of well-above-average quality. The further preferred embodiments illustrate additional features of the invention, many of which allow greatly improved audio quality.

Figure 5:
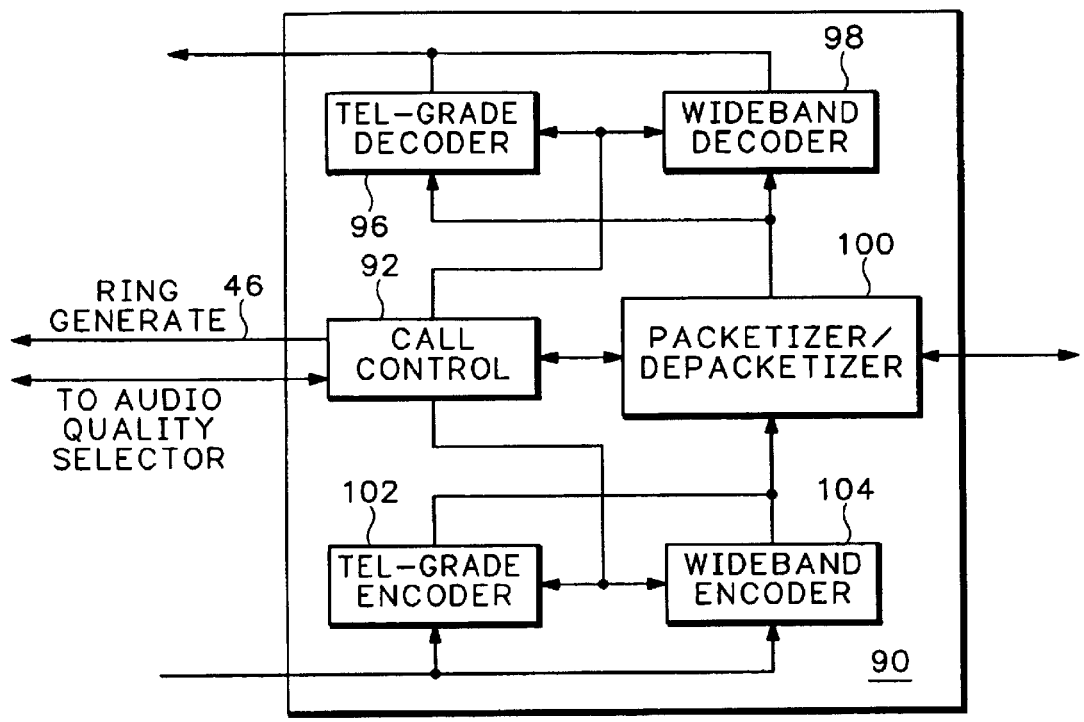
FIGS. 5, 6, and 7 show alternate telephone/data network interface configurations according to the present invention.

FIG. 5 illustrates a digital voice processor 90 that, in addition to the dual decoders 96 and 98, uses dual voice encoders 102 and 104. This system allows transmission, as well as reception, of dual-quality audio. Telephone-grade encoder 102 provides a default. Call control 92 can utilize wideband encoder 104 in one of several ways. It can switch to encoder 104 in tandem with switches to wideband decoder 96. It can allow the user to choose the encoder separate from the decoder. Or it can send wideband whenever the opposite end is equipped to receive it and/or requests it, with no user input required.

Figure 6:
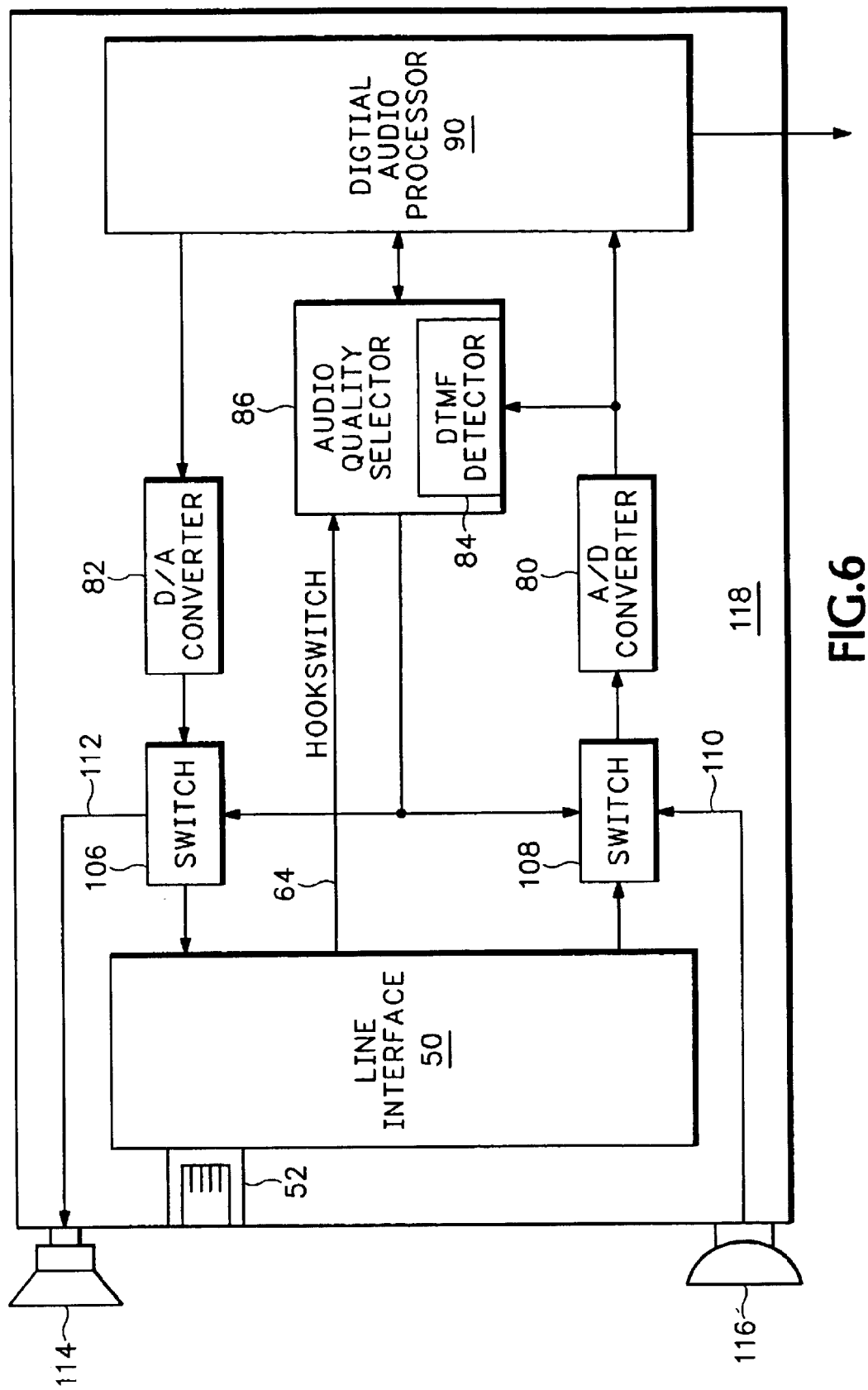

FIG. 6 shows a telephone/data network interface 118 with a switchable audio input and output, separate from the POTS phone connection point 52. A user of this system can use their POTS phone normally to initiate and receive phone calls. But by issuing a command over their POTS phone, the user can activate a switchable audio input 110 and/or audio output 112. The command may be the same command used to activate wideband encoders and decoders, or an independent command.

Audio quality selector 86 operates analog switches 106 and 108. Enabling analog switch 106 redirects incoming audio away from line interface 50 to an audio output 112 and 114. Enabling analog switch 108 redirects the local audio input away from line interface 50 to audio input 110 and 116. These switches could be ganged in a particular embodiment. Switch 106 could also have a position that supplies incoming audio to both line interface 50 and audio output 112. Switch 108 could also have a mixing position that combines audio received from line interface 50 with audio received from input 110.

When audio input is selected away from the POTS jack 52, POTS DTMF or voice commands cannot be processed with this particular embodiment. But commands may still be issued with the switchhook. For instance, a switchhook flash can be used to signal that audio is to be switched back to line interface 50. And an on-hook condition can still be used to end a call. When audio is selected away from the POTS phone, a separate source of commands (such as keyboard commands if audio is rerouted to a computer) may also be examined by audio quality selector 86.

An additional design consideration for a system according to the invention is digital sample rate. Common telephone-grade codecs operate at an 8 kHz digital sample rate, while common wideband codecs generally operate at 16 kHz or higher sample rates. A system according to the present invention must be compatible with both telephone-grade and wideband external sample rates.

Figure 7:
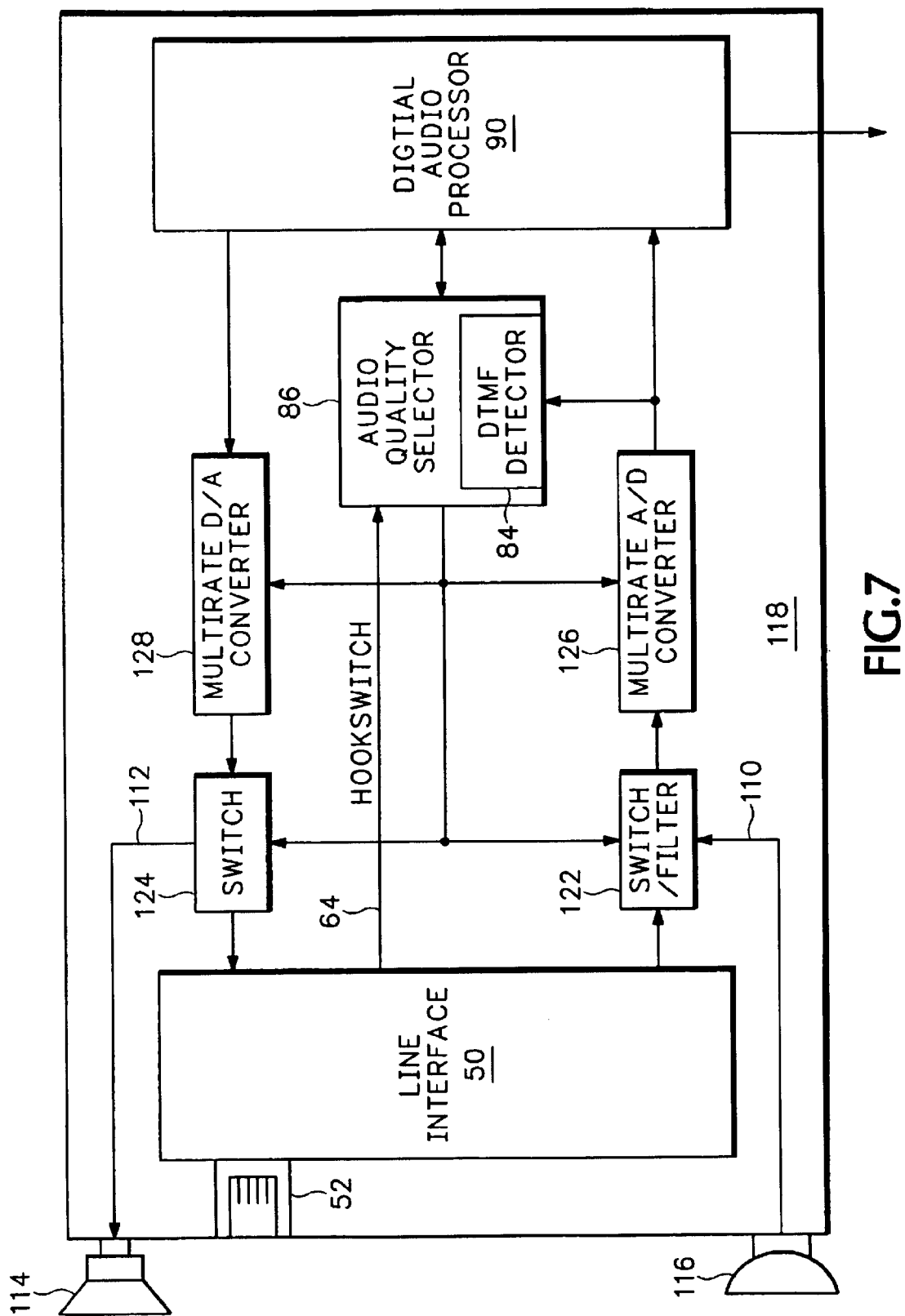

One possible method of coping with different sample rates is to employ multi-rate conversion. FIG. 7 shows a telephone/data network interface 120 having multi-rate A/D and D/A converters 126 and 128. Audio quality selector 86 signals converters 126 and 128 as to the appropriate rate to use for conversion. This method may require a switchable anti-aliasing filter, shown incorporated with switch 122. This filter should be enabled to cut out high frequencies prior to A/D converter 126 when low-rate sampling is enabled, particularly if a wideband audio input is selected. It can be disabled, or a wideband anti-aliasing filter enabled instead, when high-rate sampling is enabled.

A second possible method of coping with different sampling rates uses single-rate converters that operate at the highest sample rate needed for wideband codecs used in the system. In this configuration, A/D and D/A converters are always run at this high rate. When the digital audio processor receives incoming remote audio at a lower sample rate, the audio is converted to the high rate prior to playout (e.g., by repeating samples or interspersing interpolating samples in the data) on the D/A. Outgoing audio is sampled at the high rate, regardless of the fidelity of the analog source. When a low-rate digital codec is enabled, the outgoing digital audio can be digitally low-pass filtered and then downsampled to the appropriate rate for presentation to the encoder.

Figure 8:
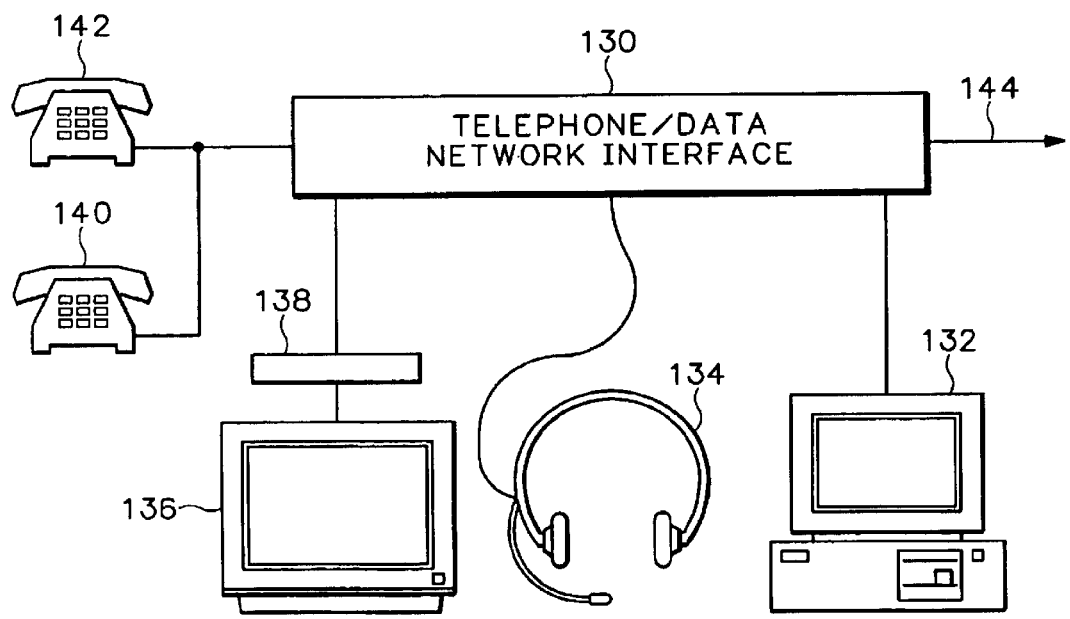
FIG. 8 shows a local configuration for an integrated telephone/data access device according to the present invention.

The present invention can find application in an integrated telephony/wideband data device 130 as shown in FIG. 8. Data network connection 144 may, for a specific system, be a cable modem connection, an xDSL (a family of digital subscriber loops) modem connection, an ISDN (integrated services digital network) connection, or an IP baseband connection to a packet data network. Device 130 allows connection of multiple POTS phones 140 and 142. It also provides a digital data connection to a computer 132, an analog audio connection to a headset 134, and a connection to a set-top box 138 (which is in turn connected to a television 136). FIG. 8 is illustrative, and a particular device 130 may provide connection points for either more or fewer output devices than pictured.

Phone calls may be initiated and received over either phone 140 or 142 as described above. When a telephone user so desires, they can signal device 130 to enable wideband and/or to set one or more multiple position switches (e.g., like switches 106 and 108 of FIG. 6) to select among television 136, headset 134, and computer 132 for continuation of the call. A command for "on TV" could mean redirect audio output from the POTS handset to the TV audio, place the current TV audio programming in captioning mode, and negotiate for the wideband decoder. A command for "on headset" could mean redirect audio input and output from the POTS handset to a headset jack. And a command for "on PC" could mean activate an application on the computer and redirect audio input and output to the computer's microphone and speakers.

With respect to a computer, switching preferably would be done at a different point in device 130. Since computers generally have their own audio A/D and D/A converters, PCM audio streams may be sent in packets between device 130 and computer 132, bypassing the A/D and D/A converters of device 130. If the computer also has the capability to run the required audio codecs, the digital audio processor of device 130 may simply process control packets, and bridge audio packets between the network and the computer upon audio selection to the computer.

The user of device 130 may also select automatic preferences. For instance, incoming calls may be automatically directed to a location other than the POTS handset. Preferred configurations and associated commands may also be stored in device 130.

The present invention can also be incorporated into a system employing a digital phone, such as an IP phone or a digital PBX system. The operation of the present invention with such a system is similar to that described above, except that digital signaling such as a specialized "wideband" or "to computer" button on a digital phone can be programmed to initiate audio quality selection, and could still function even if audio were transferred elsewhere. In an IP phone, the phone bridges traffic to the selected wideband device. In a PBX system, the desk unit could bridge to a local wideband connection, or the central PBX switch could bridge, e.g., to the user's desktop computer. A system according to the invention may also use a phone that is integrated into a computer to issue audio quality selection commands to the telephone/data network interface.

After reading this disclosure, one of ordinary skill in the art will recognize that many advantageous modifications to the disclosed embodiments are enabled by the concepts taught herein. For example, although a packet data network has been used to illustrate the preferred embodiments, a time-division-multiplexed data network may also be used for data communication. The specific device features described herein may also be combined in a variety of permutations. The preferred embodiment of a digital audio processor and audio-quality selector is a software-configured digital signal processor—this includes partitioning of the described digital functions among several general purpose and/or special purpose processors, or utilization of a time partition on a processor also performing other tasks.

Other modifications to the disclosed embodiments will be obvious to those of ordinary skill in the art upon reading this disclosure, and are intended to fall within the scope of the invention as claimed.

What is claimed is:

1. An analog telephone/digital data network interface comprising:

a digital data network connection point;

an analog local telephone connection point;

a digital audio processor having at least one selectable telephone-grade digital audio decoder and at least one selectable wideband digital audio decoder, the processor connected in a two-way audio path between the digital data network connection point and the analog local telephone connection point so that the selectable telephone-grade digital audio decoder or the selectable wideband digital audio decoder can be selected to decode data received over the digital data network connection point;

an audio quality selector that responds to a command signal received at the analog local telephone connection point by requesting a switch from the telephone-grade to the wideband digital audio decoder for local audio output from the digital audio processor; and a switchable wideband audio output, separate from the analog local telephone connection point, that is selectable by the audio quality selector in response to a command signal received at the analog local telephone connection point.

2. The telephone/data network interface of claim 1, wherein the analog local telephone connection point comprises a line interface compatible with a standard two-wire analog telephone.

3. The telephone/data network interface of claim 1, wherein the digital data network connection point is a packet data interface.

4. A telephone/data network interface, comprising:

a digital data network connection point;

an analog local telephone connection point;

a digital audio processor having at least one selectable telephone-grade digital audio decoder and at least one selectable wideband digital audio decoder;

an audio quality selector that responds to a command signal received at the analog local telephone connection point by requesting a switch from the telephone-grade to the wideband digital audio decoder for local audio output from the digital audio processor; and a switchable wideband audio output, separate from the analog local telephone connection point, that is selectable by the audio quality selector in response to a command signal received at the analog local telephone connection point; and the audio quality selector configured in the two-way audio path between the digital data network connection point and the analog local telephone connection point so that the selectable telephone-grade digital audio decoder or the selectable wideband digital audio decoder can be selected to decode data received over the digital data network connection point.

5. The telephone/data network interface of claim 4 including a switchable wideband audio output, separate from the analog local telephone connection point, that is selectable by the audio quality selector in response to a command signal received at the analog local telephone connection point.

6. A telephone/data network interface comprising:

a digital data network connection point;

an analog local telephone connection point;

a digital audio processor having at least one selectable telephone-grade digital audio decoder and at least one selectable wideband digital audio decoder, the processor connected between the digital data network connection point and the analog local telephone connection point so that both the selectable telephone-grade digital audio decoder and the selectable wideband digital audio decoder can each receive a signal from the digital data network connection point and output the received signal to the analog local telephone connection point; and an audio quality selector that responds to a command signal received at the analog local telephone connection point by requesting a switch from the selectable telephone-grade digital audio decoder to the selectable wideband digital audio decoder for local audio output from the digital audio processor.

7. A telephone/data network interface comprising:

a digital data network connection point;

an analog local telephone connection point;

a digital audio processor having at least one selectable telephone-grade digital audio decoder and at least one selectable wideband digital audio decoder, the processor connected in a two-way audio path between the digital data network connection point and the analog local telephone connection point;

an audio quality selector that responds to a command signal received at the analog local telephone connection point by requesting a switch from the telephone-grade to the wideband digital audio decoder for local audio output from the digital audio processor; and a switchable wideband audio output, separate from the analog local telephone connection point, that is selectable by the audio quality selector in response to a command signal received at the analog local telephone connection point, wherein the wideband audio output overrides an audio signal presented to a television receiver.

8. A telephone/data network interface comprising:

a digital audio processor having at least one selectable telephone-grade digital audio decoder and at least one selectable wideband digital audio decoder;

an audio quality selector that responds to a command signal by requesting a switch from the telephone-grade to the wideband digital audio decoder; and a multi-rate analog-to-digital audio converter having a first sample rate compatible with telephone-grade audio sampling and a second sample rate compatible with wideband audio sampling, said analog-to-digital converter receiving an analog audio input, outputting digital audio to the digital audio processor, and having a sample rate selector controlled by the audio quality selector.

9. A telephone/data network interface comprising:

a digital data network connection point;

an analog local telephone connection point;

a digital audio processor having at least one selectable telephone-grade digital audio decoder and at least one selectable wideband digital audio decoder, the processor connected in a two-way audio path between the digital data network connection point and the analog local telephone connection point;

an audio quality selector that responds to a command signal received at the analog local telephone connection point by requesting a switch from the telephone-grade to the wideband digital audio decoder for local audio output from the digital audio processor;

the digital audio processor further comprising at least one telephone-grade digital audio encoder and at least one wideband digital audio encoder, wherein the audio quality selector also responds to a command signal received over the analog local telephone interface by requesting either a telephone-grade or a wideband digital audio encoder for processing of locally-originated audio signals; and a multi-rate analog-to-digital audio converter having a first sample rate compatible with telephone-grade audio sampling and a second sample rate compatible with wideband audio sampling, said analog-to-digital converter receiving local analog audio input, outputting digital audio to the digital audio processor, and having a sample rate selector controlled by the audio quality selector.

10. The telephone/data network interlace of claim 9, further comprising a switchable analog anti-aliasing filter having a filter frequency response compatible with telephone-grade audio sampling, and having a switch connected to the audio quality selector, wherein when the switch is energized, the analog anti-aliasing filter is inserted in the audio path between the local analog audio input and the analog-to-digital converter.

11. A telephone/data network interface comprising:
a digital data network connection point;
an analog local telephone connection point;
a digital audio processor having at least one selectable telephone-grade digital audio decoder and at least one selectable wideband digital audio decoder, the processor connected in a two-way audio path between the digital data network connection point and the analog local telephone connection point;
an audio quality selector that responds to a command signal received at the analog local telephone connection point by requesting a switch from the telephone-grade to the wideband digital audio decoder for local audio output from the digital audio processor; and
said digital audio processor comprising an audio-codec renegotiator that initiates a codec renegotiation with a remote digital audio processor when, at the time of a request for audio quality reselection from the audio quality selector, the current codec does not provide the requested audio quality.

12. The telephone/data network interface of claim 11, wherein said audio-grade renegotiator comprises a preset codec preference list for each possible audio quality selector request.

13. A telephone/data network interface comprising:
a digital data network connection point;
an analog local telephone connection point;
a digital audio processor having at least one selectable telephone-grade digital audio decoder and at least one selectable wideband digital audio decoder, the processor connected in a two-way audio path between the digital data network connection point and the analog local telephone connection point;
an audio quality selector that responds to a command signal received at the analog local telephone connection point by requesting a switch from the telephone-grade to the wideband digital audio decoder for local audio output from the digital audio processor; and
said digital audio processor comprising a remote input bandwidth detector, said detector responding to an indication from a remote digital audio processor that wideband input audio is available by signaling this availability over said analog telephone interface.

14. A method of operating an analog telephone/digital data network interface comprising:
presenting a standard analog telephone line interface to an attached telephone set;
detecting a signal produced at the standard analog telephone line interface by the attached telephone set by detecting the presence of a signal, on the standard analog telephone line interface, selected from a group of signals consisting of discrete-tone multi-frequency signals, on/off hookswitch conditions, voice commands, and combinations thereof;
responding to the signal by reconfiguring audio processing between a telephone-grade processing path and a wideband processing path within the telephone/data network interface; and
upon detecting the signal, ignoring an output of locally-originated audio during a time period corresponding to the signal.

15. A method of operating an analog telephone/digital data network interface comprising:
means for presenting a standard analog telephone line interface to an attached telephone set;
detecting a signal produced at the standard analog telephone line interface by the attached telephone set; and
responding to the signal by reconfiguring audio processing between a telephone-grade processing path and a wideband processing path within the telephone/data network interface;
means for detecting the presence of a transducer separate from the attached telephone set.

16. A cable modem transceiver comprising:
a data connection point;
an analog telephone connection point;
a switch circuit selectively enabling a wideband audio decoder or a telephone-grade audio decoder to decode audio signals from the data connection point; and
an audio quality selector configured to direct the switch circuit to connect decoded audio signals from the wideband audio decoder or the telephone-grade audio decoder to the analog telephone connection point in response to a command signal received from the analog telephone connection point.

17. A system for operating an analog telephone/digital data network interface comprising:
means for presenting a standard analog telephone line interface to an attached telephone set;
means for detecting a signal produced at the standard analog telephone line interface by the attached telephone set;
means for responding to the signal by reconfiguring audio processing between a telephone-grade processing path and a wideband audio coding processing path within the telephone/data network interface;
means for detecting the presence of a signal, on the standard analog telephone line interface, selected from the group of signals consisting of discrete-tone multi-frequency signals, on/off hookswitch conditions, voice commands, and combinations thereof; and
means for removing output of locally-originated audio during a time period corresponding to the signal.

18. An electronic storage medium containing software for operating an analog telephone/digital data network interface, the electronic storage medium comprising:
code for presenting a standard analog telephone line interface to an attached telephone set;

code for detecting a signal produced at the standard analog telephone line interface by the attached telephone set; and code for responding to the signal by reconfiguring audio processing between a telephone-grade processing path and a wideband audio coding processing path within the telephone/data network interface;

code for detecting the presence of a signal, on the standard analog telephone line interface, selected from the group of signals consisting of discrete-tone multi-frequency signals, on/off hookswitch conditions, voice commands, and combinations thereof; and code for removing output of locally-originated audio during a time period corresponding to the signal.

19. A telephone control circuit, comprising:

a network connection for receiving a low bandwidth audio signal and a high bandwidth audio/data signal;

a low fidelity telephone connection;

a separate high fidelity audio/data interface;

a switching circuit configured to respond to a command signal received over the low fidelity telephone connection by adapting the control circuit to output the low bandwidth audio signal to the low fidelity telephone connection or separately output the high bandwidth audio/data signal to the high fidelity audio/data interface; and at least one selectable telephone-grade digital audio decoder and at least one selectable wideband digital audio decoder configured in an audio path between the network connection and the low fidelity telephone connection so that the selectable telephone-grade digital audio decoder or the selectable wideband digital audio decoder can selectively decode data received over the network connection.

20. A telephone control circuit, comprising:

a network connection for receiving a low bandwidth audio signal and a high bandwidth audio/data signal;

a low fidelity telephone connection;

a separate high fidelity audio/data interface;

a switching circuit configured to respond to a command signal received over the low fidelity telephone connection by adapting the control circuit to output the low bandwidth audio signal to the low fidelity telephone connection or separately output the high bandwidth audio/data signal to the high fidelity audio/data interface; and a digital audio processor comprising a remote input bandwidth detector, said detector responding to an indication from a remote digital audio processor that the high bandwidth audio/data signal is available by signaling this availability over the low fidelity telephone connection.

21. A telephone control circuit, comprising:

a network connection for receiving a low bandwidth audio signal and a high bandwidth audio/data signal;

a low fidelity telephone connection;

a separate high fidelity audio/data interface;

a switching circuit configured to respond to a command signal received over the low fidelity telephone connection by adapting the control circuit to output the low bandwidth audio signal to the low fidelity telephone connection or separately output the high bandwidth audio/data signal to the high fidelity audio/data interface; and at least one selectable telephone-grade digital audio decoder and at least one selectable wideband digital audio decoder connected in a two-way audio path between the network connection and the low fidelity telephone connection so that the selectable telephone-grade digital audio decoder or the selectable wideband digital audio decoder can be selected to decode data received over the network connection.

22. The telephone control circuit according to claim 19 including a switching circuit configured to respond to a command signal received over the low fidelity telephone connection by outputting the low bandwidth audio signal to the low fidelity telephone connection or separately outputting the high bandwidth audio/data signal to a high fidelity audio/data interface.

23. The telephone control circuit according to claim 22 wherein the command signal received over the low fidelity telephone connection is a Dual Tone Multi-Frequency (DTMF) signals or hook-flash signals initiated by a telephone user.

24. A telephone control circuit, comprising:

a network connection for receiving a low bandwidth audio signal and a high bandwidth audio/data signal;

a low fidelity telephone connection;

a separate high fidelity audio/data interface;

a switching circuit configured to respond to a command signal received over the low fidelity telephone connection by adapting the control circuit to output the low bandwidth audio signal to the low fidelity telephone connection or separately output the high bandwidth audio/data signal to the high fidelity audio/data interface;

wherein the command signal received over the low fidelity telephone connection is a Dual Tone Multi-Frequency (DTMF) signals or hook-flash signals initiated by a telephone user; and wherein a notification signal sent over the low fidelity telephone connection audibly notifies the telephone user of the availability of the high bandwidth audio/data signal and the telephone user has to then manually initiate the command signal for switching signals from the network connection from the low fidelity telephone connection to the separate high fidelity audio/data interface by generating the DTMF signals or the hook-flash signals.

* * * * *